United States Patent
Jackson et al.

(10) Patent No.: US 8,645,599 B2
(45) Date of Patent: Feb. 4, 2014

(54) CONSUMER MEDIA PLAYER

(75) Inventors: Gregor Said Jackson, Campbell, CA (US); Mario Brotz, Mountain View, CA (US); Sathyanarayanan Nagarajan Iyer, Santa Clara, CA (US); Thomas R. Goligoski, Mountain View, CA (US)

(73) Assignee: Renesas Electronics America, Inc., Santa Clara, CA (US)

( * ) Notice: Subject to any disclaimer, the term of this patent is extended or adjusted under 35 U.S.C. 154(b) by 0 days.

(21) Appl. No.: 12/683,941

(22) Filed: Jan. 7, 2010

(65) Prior Publication Data

US 2010/0306428 A1  Dec. 2, 2010

Related U.S. Application Data

(60) Provisional application No. 61/143,051, filed on Jan. 7, 2009.

(51) Int. Cl.
*G06F 13/22* (2006.01)
*G06F 5/00* (2006.01)
*H04B 1/38* (2006.01)
*G06F 13/00* (2006.01)

(52) U.S. Cl.
USPC .............. 710/72; 710/62; 710/73; 710/74; 345/156; 375/219; 375/222; 708/160

(58) Field of Classification Search
None
See application file for complete search history.

(56) References Cited

U.S. PATENT DOCUMENTS

| | | | |
|---|---|---|---|
| 6,654,827 B2 * | 11/2003 | Zhang et al. | 710/62 |
| 6,670,984 B1 * | 12/2003 | Tanaka et al. | 348/159 |
| 7,381,096 B2 * | 6/2008 | Alejandro et al. | 439/638 |
| 7,564,678 B2 * | 7/2009 | Langberg et al. | 361/679.01 |
| 7,742,293 B2 * | 6/2010 | Strauser | 361/679.41 |
| 7,814,220 B2 * | 10/2010 | Rydenhag | 709/231 |
| 7,827,344 B2 * | 11/2010 | Kalayjian | 710/313 |
| 2003/0101305 A1 * | 5/2003 | Kang et al. | 710/303 |
| 2004/0150944 A1 * | 8/2004 | Byrne et al. | 361/683 |
| 2005/0155050 A1 * | 7/2005 | Tucker et al. | 720/654 |
| 2008/0244144 A1 * | 10/2008 | Choi | 710/303 |
| 2009/0125609 A1 * | 5/2009 | Wood et al. | 709/219 |
| 2009/0282078 A1 * | 11/2009 | Thomas et al. | 707/104.1 |
| 2010/0162327 A1 * | 6/2010 | Bonar | 725/77 |

* cited by examiner

*Primary Examiner* — Henry Tsai
*Assistant Examiner* — Jing-Yih Shyu
(74) *Attorney, Agent, or Firm* — Campbell Stephenson LLP (57) ABSTRACT

A consumer media player is configured to be electronically coupled to various different types of media source devices, extract media files from those media source devices, and play the extracted media files to a consumer. The consumer media player is also configured to physically hold all or part of one or more media source devices in a manner that facilitates electronic coupling of the media source device to the consumer media player and that provides an aesthetically pleasing appearance to the consumer. In particular, the consumer media player includes a cavity that can hold at least a portion of the media source device. In one of the embodiments described herein, at least some types of media source devices can be entirely physically stored within the cavity in the consumer media player.

14 Claims, 8 Drawing Sheets

CONSUMER MEDIA PLAYER

RELATED APPLICATION

This invention claims priority, under 35 U.S.C. §119 (e), to U.S. Provisional Application 61/143,051, entitled "Consumer Media Player," which was filed on Jan. 7, 2009 and names Gregor Said Jackson, Mario Brotz, Sathyanarayanan Iyer, and Tom Goligoski as inventors. The above-referenced application is hereby incorporated by reference in its entirety as if completely and fully set forth herein.

FIELD OF THE INVENTION

This invention relates to consumer electronics and, more particularly, to consumer media players.

RELATED ART

Many consumers own small portable electronic media source devices that are designed to store and, in at least some cases, play various types of media (e.g., audio, video, images, and the like). For example, a large number of consumers own iPod (TM) portable music and video players provided by Apple, Inc. of Cupertino, Calif., which can store and play audio files, image files, and video files. Similarly, many consumers own portable memory devices, such as Universal Serial Bus (USB) flash drives and flash cards, which can store various media, including audio files, image files, and movie files.

Most portable electronic media source devices are designed to be connected to computing devices, such as desktop computers and laptop computers. Media can be transferred to and from the portable electronic media source device from such a computing device. Such computing devices are designed to run various software applications (e.g., such as graphics and movie editing software, word processing software, spreadsheet software, web browser software, and the like) and are generally designed to be used while situated on a desk or on a user's lap. Generally, consumers find that such computing devices make poor media players, because of the computing device's site and/or aesthetics. For example, it is typically uncomfortable for a user to view a movie on a laptop, especially if there are multiple viewers at the same time.

Furthermore, many consumers find playing media via such computing devices to be unnecessarily complicated. Generally, such computing devices provide different user interfaces for each type of media and, in at least some situations, for the same type of media sourced from different types of portable electronic media source devices (e.g., if those different media source devices have different manufacturers, each of which has provided a manufacturer-specific user interface for interacting with media stored on its media source device).

BRIEF DESCRIPTION OF THE DRAWINGS

A more complete understanding of the present invention may be acquired by referring to the following detailed description and the accompanying drawings, listed below, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DESCRIPTION OF THE INVENTION

A consumer media player is configured to be electronically coupled to various different types of media source devices, extract media files from those media source devices, and play the extracted media files to a consumer. The consumer media player is also configured to physically hold all or part of one or more media source devices in a manner that facilitates electronic coupling of the media source device to the consumer media player and that provides an aesthetically pleasing appearance to the consumer. In particular, the consumer media player includes a cavity that can hold at least a portion of the media source device. In one of the embodiments described herein, at least some types of media source devices can be entirely physically stored within the cavity in the consumer media player.

The consumer media player is configured to be electronically coupled to and physically hold a variety of different media source devices, each of which can have a different size, shape, manufacturer, and/or type. Thus, the cavity within the consumer media player is sized to hold all or part of media source devices of different sizes and types. Furthermore, the consumer media player includes one or more appropriate interfaces to electronically couple to a variety of different types of media source devices.

A consumer media player is designed specifically to play media files for a consumer. Accordingly, since the consumer media player is a specialized device that does not need to incorporate generic computing functionality, the consumer media player can be sold at a much lower price point than a personal computing device. For example, a personal computing device such as a desktop computer or laptop computer is designed to perform many different computing tasks, including executing user software applications (e.g., applications for word processing, database, spreadsheet, graphics editing, video editing, web browsing, and the like), which can require significantly more expensive processing power to support than the much more limited set of applications (e.g., for playing media, extracting media from media source devices, and obtaining related media from a network connection) supported by the consumer media player.

Similarly, a consumer media player can differ from a personal computing device in the manner in which the consumer media player is used. For example, a consumer media player can be designed to be wall mounted or otherwise mounted in a location that would make use of a traditional keyboard difficult. Instead of receiving user input via such as a keyboard and/or mouse (as would be done by most personal computing devices), the consumer media player can receive user input via an input device such as a touch screen, set of integrated control buttons or switches, and/or remote control. These differences allow consumer media players to provide a more comfortable environment for consumers to play media that would be possible if a personal computing device was used to play media. For example, by mounting a consumer media player on a wall and then playing video files on that consumer media player, a user may more comfortably view the video files than if the user attempted to play the video files on a laptop computer.

Media source devices are portable electronics, such as those in the EMMA Mobile (TM) series of products available from NEC Electronics, that store media files such as image files (e.g., having extensions such as .3DM, .3DMF, .AI, .BMP, .DRW, .DXF, .EPS, .GIF, .INDD, .JPEG, .JPG, .MNG, .PCT, .PDF, .PNG, .PS, .PSD, .PSP, .QXD, .QXP, .SVG, .TIF, .TIFF, and the like), music files (e.g., having extensions such as .MP3, .WAV, .WMA, .AAC, .AIF, .IFF, .M3U, .MID, .MIDI, .MPA, .RA, .RAM, and the like), and/or video files (e.g., having extensions such as .MOV files, .WMV, .3GP, .ASF, .ASX, .AVI, .MPG, .MP4, .QT, .RM, .SWF, and the like). Some media source devices may be configured to only store a particular type of media file; other media source devices may store any type of media file.

Media source devices are configured to be relatively small and generally have much smaller displays, if any, than computing devices such as laptop computers and desktop computers. Furthermore, like the consumer media players, the media source devices are generally not full purpose computers and are not capable of running a wide variety of user software applications for more computationally intensive tasks such as graphics editing, desktop publishing, database editing, and the like. Many media source devices (e.g., such as external hard drives, flash drives, and the like) have limited or even no processing capabilities.

Some media source devices are able to play one or more types of media files. For example, phones (e.g., such as the iPhone (TM)) may be able to display image files (as used herein, an image file is "played" when that image file is displayed to a user) as well as to play audio and/or video files. However, some media source devices, such as flash drives, are not able to play media files.

Media source devices that do play media files generally only allow one user to experience the played media file at a time. For example, iPods (TM) typically provide headphones to be used by one user at time. Similarly, portable video players often provide small screens and only have headphone outputs or limited speaker capability, making it difficult for more than one user to experience a played media file at the same time.

In contrast to a media source device, a consumer media player provides a way to play media files in a manner that allows more than one user to experience the media file at the same time. For example, the consumer media player can include a larger (e.g., 15 inches in size) display that can be mounted on a wall or otherwise displayed in the same manner as a television set. Similarly, the consumer media player can include larger audio speakers (e.g., comparable to a television) and/or audio outputs that allow external speakers to be connected to the consumer media player in the same manner as conventional stereo equipment.

As noted above, the consumer media player is configured to interact with a variety of different media source devices. The same consumer media player is configured to extract media files from different types (e.g., flash drives, portable MP3 players, portable video players, phones that store MP3s and/or videos, external hard drives, and the like) of media source devices. Additionally, the same consumer media player is configured to extract media files from devices of the same type that have different manufacturers from each other and/or from the consumer media player. Thus, the consumer media player is able to interface with media source devices regardless of the manufacturer and type of media source device. This allows a consumer a great deal of flexibility in choosing media source devices that will be compatible with the consumer media player.

The consumer media player is also configured to provide a generic user interface. The same user interface can be used to play media files for a user, regardless of the type and/or manufacturer of the media source device from which the media file was obtained. Thus, instead of using one user interface to see MP3 files stored on a Zune (TM) (available from Microsoft, Corp. of Redmond, Wash.) media source device and another user interface to see MP3 files stored on an iPod (TM) media source device, the same generic user interface can be used to see all of the MP3 files stored on both devices. Furthermore, the generic user interface can be supplied by a manufacturer (e.g., the manufacturer of the consumer media player) other than the manufacturer of either of the media source devices.

The following figures provide an example of a consumer media player. It is noted that many other consumer media players (which are not illustrated in the following figures) can also conform to the present teachings. For example, alternative consumer media players may focus on playing audio, not images and video, and thus may not include a display device. Similarly, alternative consumer media players may include multiple parts (e.g., a physical "box" or chassis that is physically separate from a display device), instead of being an integrated device like the one shown below.

FIGS. 1-4 illustrate examples of screens that can be provided as part of a generic user interface generated by the consumer media player. This user interface is generic in that the user interface is not specific to one particular type of media source device or manufacturer of such media source devices. The user interface allows a user to play media stored on a media source device without needing to physically interact with the media source device and without needing to interact with the specific user interface provided by the media source device. Accordingly, a user can play media content stored on one or more media source devices by interacting only with the consumer media player.

Figure 1:
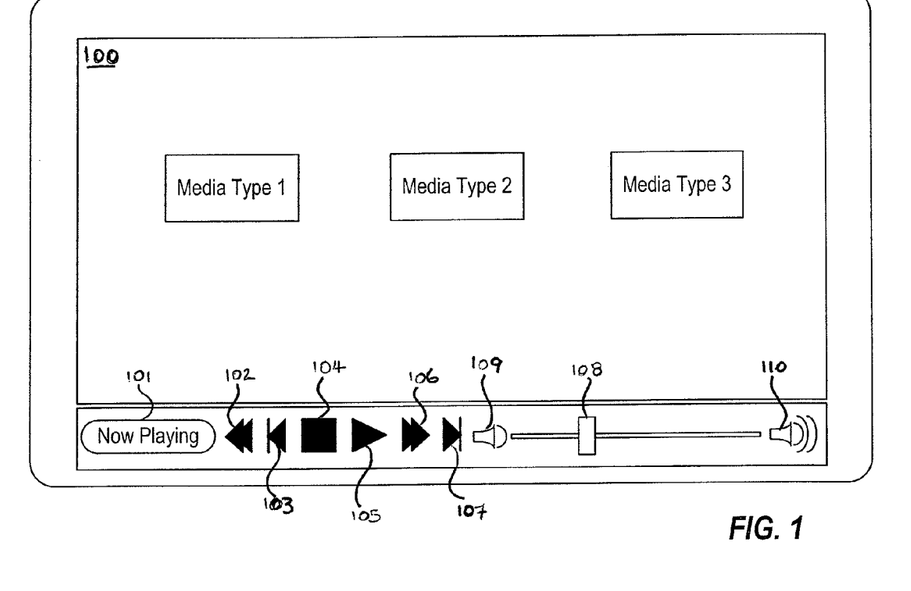
FIG. 1 illustrates a first user interface screen displayed on a consumer media player, according to one embodiment of the present invention.

FIG. 1 illustrates a first user interface screen 100 displayed on a consumer media player that is configured as a wallmountable flat panel display. In this embodiment, the display chassis includes all of the processing components needed to operate the consumer media player. The user interface screen 100 displayed on the consumer media player of FIG. 1 can be part of a generic user interface, provided by, for example, the manufacturer of the consumer media player, that is designed to allow a user to select media files to play, regardless of the type of media file or the manufacturer of the source device from which the media files are obtained.

In FIG. 1, the user interface includes a series of user selectable buttons and other tools, such as a slider bar, that are arranged towards the bottom of the display. These buttons can be displayed on the display device and interacted with via touch screen capability. Alternatively, the buttons can be designed as hardware buttons that are included in the portion of the chassis that acts as a frame around the display. Additional buttons can be included in addition to and/or instead of those shown here.

The buttons include a "Now Playing" button 101, selection of which will result in the user interface displaying information identifying the media file currently being played. The identifying information can include a filename, the name of the work (e.g., the name of a movie being played), the creation date of the work and/or file, the artist (creator of the work) name, song and/or album title (for audio files), resolution or other information (e.g., such as camera settings for image files), source (e.g., one of several media source devices), and the like. Additional identifying information can be displayed instead of and/or in addition to that described above.

The buttons also include fast rewind 102, slow rewind 103, stop 104, play 105 (and/or pause), slow forward 106, and fast forward 107 buttons. These buttons can be used to control the rate at which audio and/or video content is played. The same buttons can also be used to cycle through several different image files (e.g., when image files are being played, selection of the play button can cause successive image files to be displayed at evenly-spaced intervals in time, while selection of the stop button can cause the display to continue to display the current image indefinitely).

A slider bar 108 can be used to control the volume of audio and/or video content being played. In the illustrated example, moving the slider bar away from the speaker icon with one sound bar 109 and towards the speaker icon with three sound bars 110 will increase the volume.

The main portion of the user interface screen shown in FIG. 1 provides a user with a choice between three media types: Media Type 1, Media Type 2, and Media Type 3. For example, these media types can include Audio, Video, and Still Image. Depending upon the display, audio, and other capabilities of the consumer media player, additional types of media can be supported instead of and/or in addition to these three. Furthermore, some consumer media players may support fewer than three media types. A user can select (e.g., via a touch screen or other input device, such as a remote control, control panel, keypad, or the like) one of the displayed types of media in order to browse a list of media files of that type that are available to be played on the consumer media player.

Figure 2:
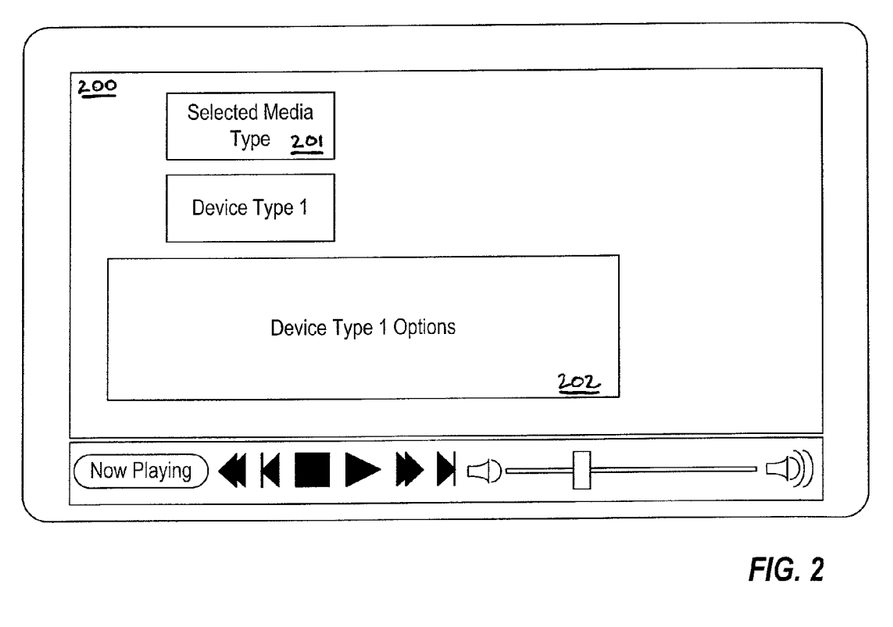
FIG. 2 illustrates a second user interface screen displayed on a consumer media player, according to one embodiment of the present invention.
Figure 3:
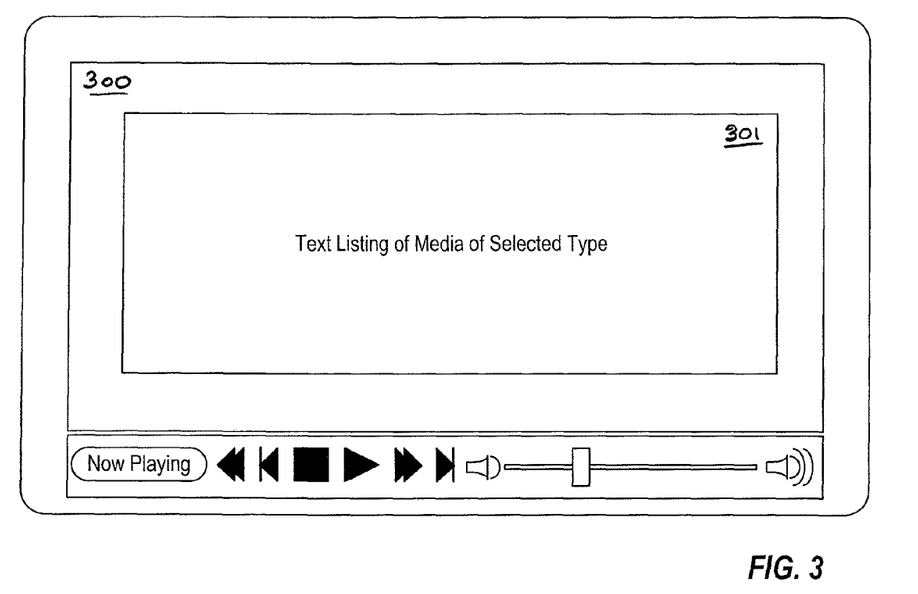
FIG. 3 illustrates a third user interface screen displayed on a consumer media player, according to one embodiment of the present invention.

FIG. 2 illustrates a second user interface screen 200 displayed on a consumer media player. This screen can be displayed in response to a user selecting a particular type of media. In this screen, the user is shown the selected media type 201 and provided with options corresponding to particular media source devices (alternatively, the user can simply be shown a list of all media of the selected type, as shown in FIG. 3) that store media files of the selected media type. In this example, only one type (Device Type 1) of source media device is available for the selected media type (e.g., because only one type of source media device storing that type of media file has been electronically coupled to the consumer media player). In response to the user selecting that device type (Device Type 1), the consumer media player displays a plurality of options 202 corresponding to that device type. These options can include options such as those specifying how media files of the selected type should be handled (e.g., by automatically copying those files from the media source device to local storage provided by the consumer media player whenever a media source device of that type is electronically coupled to the media source device). The options can also include the preferred display format for browsing files of the selected type and the like.

FIG. 3 illustrates a third user interface screen 300 displayed on a consumer media player. In this example, the display shows a text listing 301 of available media of the selected type. This text listing can, for example, list all of the filenames of still image files available to be played (small icons or small representations of those still image files can also be displayed alongside the text filename). The text listing can list tags of other user-provided information instead of and/or in addition to still image filenames. If the selected media type is audio files, the display can show a list of audio files by filename or a list of audio works (e.g., each of which can be stored in a separate file) by artist, album, and/or song title. If the selected media type is video files, the display can show a list of video filenames and/or a list of video works (e.g., each of which can be stored in a separate set of one or more video files) by title (other identifying information such as release date, director, starring actors, producer, and the like may also be included).

In one embodiment, the consumer media player obtains the information identifying each media file from the media source device that stores that media file. Alternatively, for at least some types of media (e.g., audio files), the consumer media player can be configured to obtain the identifying information by, for example, connecting to a network and accessing a database of information identifying files of that media type, comparing information (e.g., checksums, file sizes, and the like) within each media file to that database, and extracting the relevant information from the database. This information can be stored on a storage device included within and/or coupled to the consumer media player.

Figure 4:
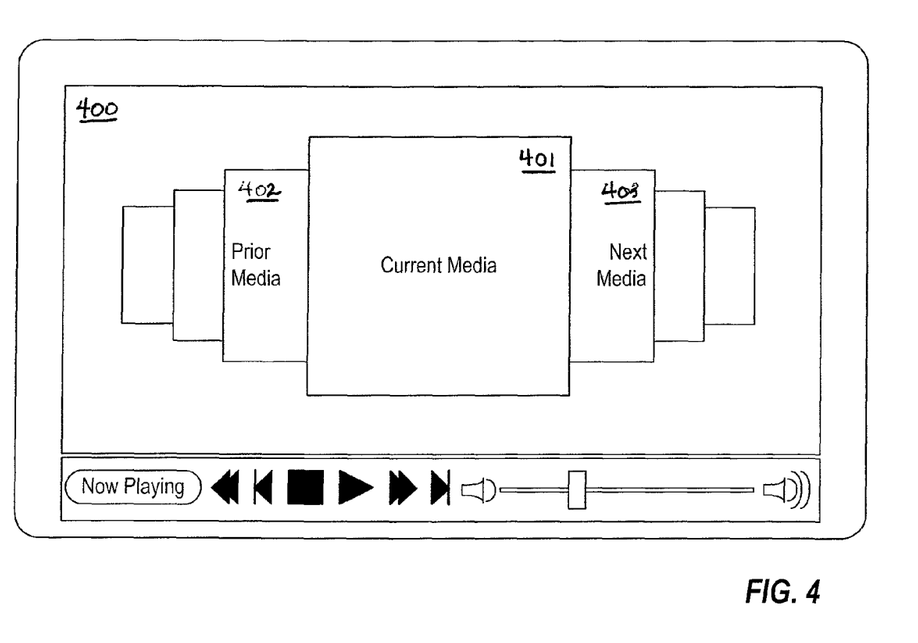
FIG. 4 illustrates a fourth user interface screen displayed on a consumer media player, according to one embodiment of the present invention.

FIG. 4 illustrates a fourth user interface screen 400 displayed on a consumer media player. This display screen shows several images, each of which corresponds to a particular media file or work. The "current media" image 401 represents the media file currently being played by the consumer media player. For example, if audio content is being played, the "current media" image may be an image representing an album cover, artist photo, music video still, or the like. The "prior media" image 402 similarly represents the most recently played media file, while the "next media" image 403 represents the next media file to be played. Additional prior and/or next media images can also be displayed, arranged in temporal relation to each other, as shown in FIG. 4.

In one embodiment, the consumer media player is configured to obtain these images either from a media source device, if available. Alternatively, the consumer media player can automatically obtain these images (e.g., by connecting to a database via a network, as described above).

Figure 5:
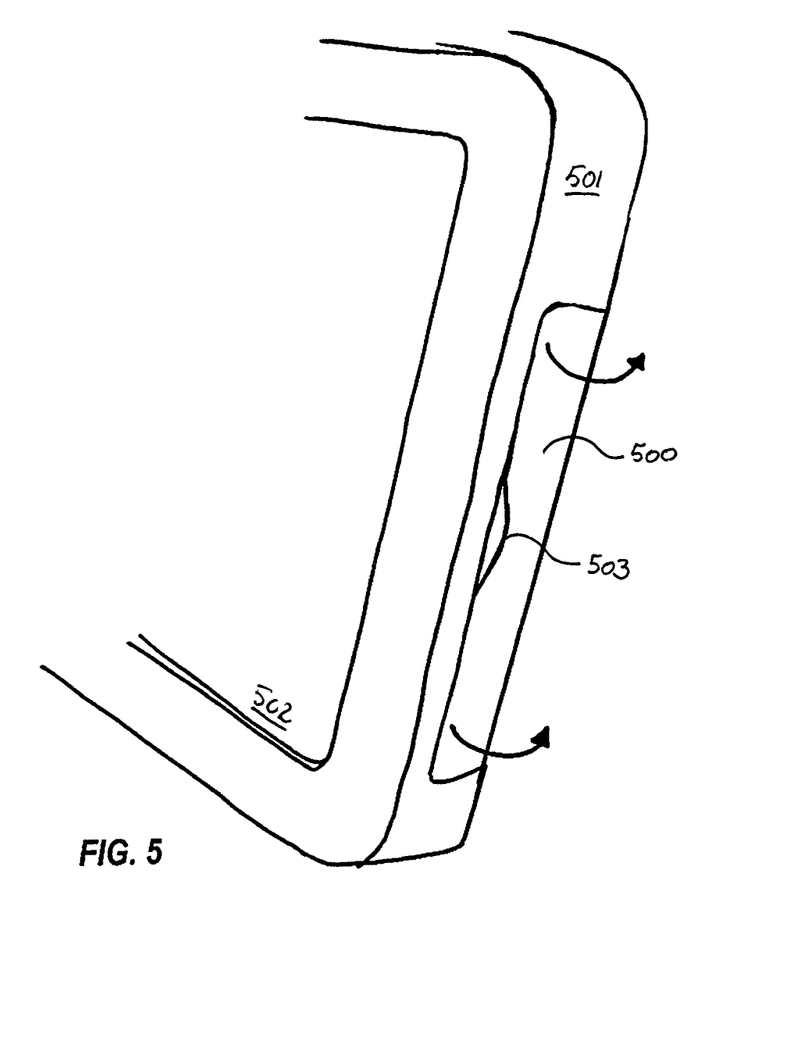
FIG. 5 is a side view of the consumer media player, according to one embodiment of the present invention.

FIG. 5 is a side view of the consumer media player. This view illustrates a hinged door 500 that is located on the side 501 of the consumer media player. As indicated by the arrows, the door is hinged to swing towards the back of the consumer media player (e.g., away from the front of the consumer media player, which includes the display 502). The door includes a raised groove 503, allowing a user to easily grasp the edge of the door (e.g., with a thumb or other finger). As shown, when closed, the door is flush with the body of the consumer media player. Accordingly, when a media source device is inserted into the cavity and the cavity door is closed, the media source device will not be seen or otherwise present visual distractions to a user of the consumer media player.

Figure 6:
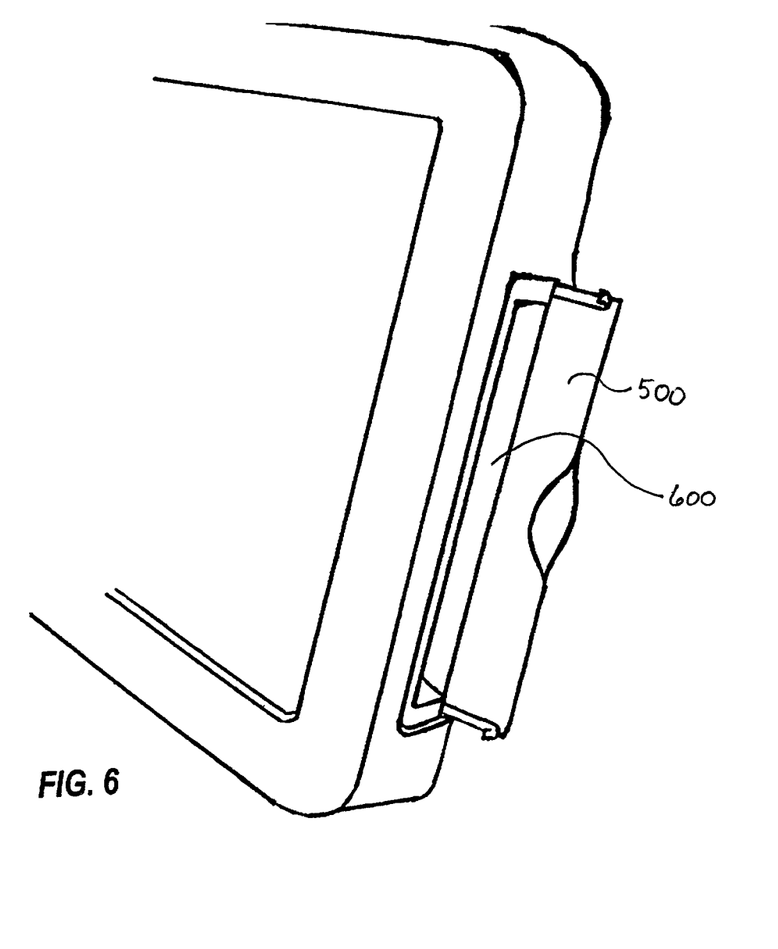
FIG. 6 illustrates how the hinged door of the consumer media player of FIG. 5 can be opened to reveal a cavity, according to one embodiment of the present invention.

FIG. 6 illustrates how the hinged door 500 of the consumer media player of FIG. 5 can be opened to reveal a cavity 600. The size of the cavity is selected to fit a wide range of media source devices, ranging from smaller devices such as Universal Serial Bus (USB) flash drives to larger devices such as iPods and external hard drives. In this example, all of these types of media source devices can fit within the cavity.

The cavity includes one or more electrical connectors (not shown). For example, the cavity can include a USB connector. Other connectors, which may be manufacturer specific (e.g., iPod connectors, iPhone connectors, and the like) can also be included. To provide increased flexibility with respect to device type and/or increased ease of use, such connectors can be attached to the end of a cable that emerges from one of the sides, walls, or back of the cavity. This cable can be of fixed or retractable length, and any loose portions of the cable can be inserted into the cavity along with the media source device.

In situations in which a USB connection is provided, a user can couple any of a variety of different media source devices to the USB connection. For example, many types of flash drives include a USB connector that can be inserted directly into the USB connection in the cavity of the consumer media player. Other types of media source devices may be connected to the USB connection using a cable, typically sold along with the media source device, that is designed to couple a media source device specific connector to a USB connection. This additional cable can be fully inserted into the cavity along with the media source device.

Figure 7:
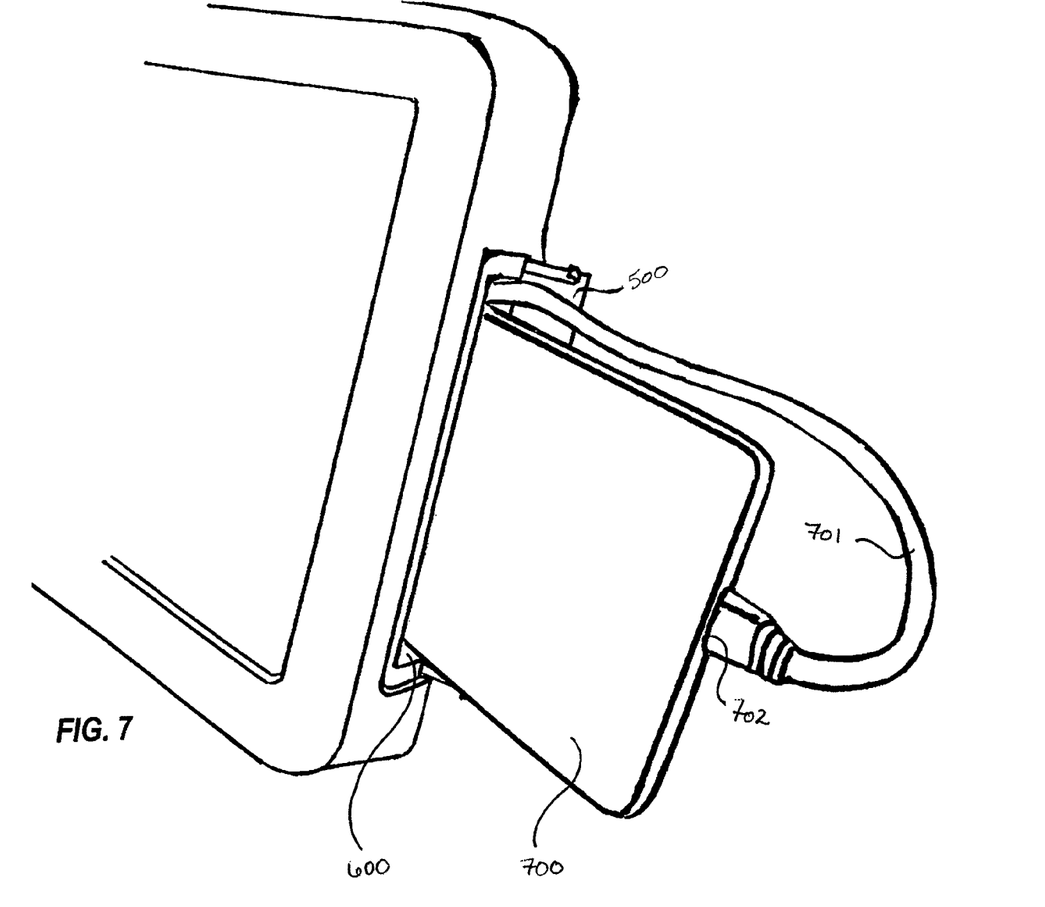
FIG. 7 illustrates how a portable electronic media source device can be connected to a cable extending from within the cavity, according to one embodiment of the present invention.

FIG. 7 illustrates how a media source device 700 can be connected to a cable 701 extending from within the cavity 600. As shown, the end of the media source device includes a connection 702, which has been connected to cable 701 that is connected to another connector (not shown) within the cavity. The media source device and the cable are in the process of being inserted into the cavity, such that a portion of the media source device and cable are located within the cavity and another portion of the media source device and cable are extending from the cavity.

Once an electrical connection has been formed between the media source device and the consumer media player, the consumer media player can begin identifying each media file stored on the media source device. This process can involve identifying the type and/or manufacturer of the media source device and then accessing that media source device in an appropriate manner (e.g., some manufacturers may store media files in proprietary and/or manufacturer-specific formats, such that it is necessary to identify the manufacturer before attempting to access the media files).

In at least some configurations of the consumer media player (and if allowed by copy controls associated with the media content), the consumer media player can also begin copying media files from the media source device to a storage device provided within and/or coupled to the consumer media player. This allows the consumer media player to have continued access to the media files, even if the media source device is later electronically disconnected from the consumer media player.

Figure 8:
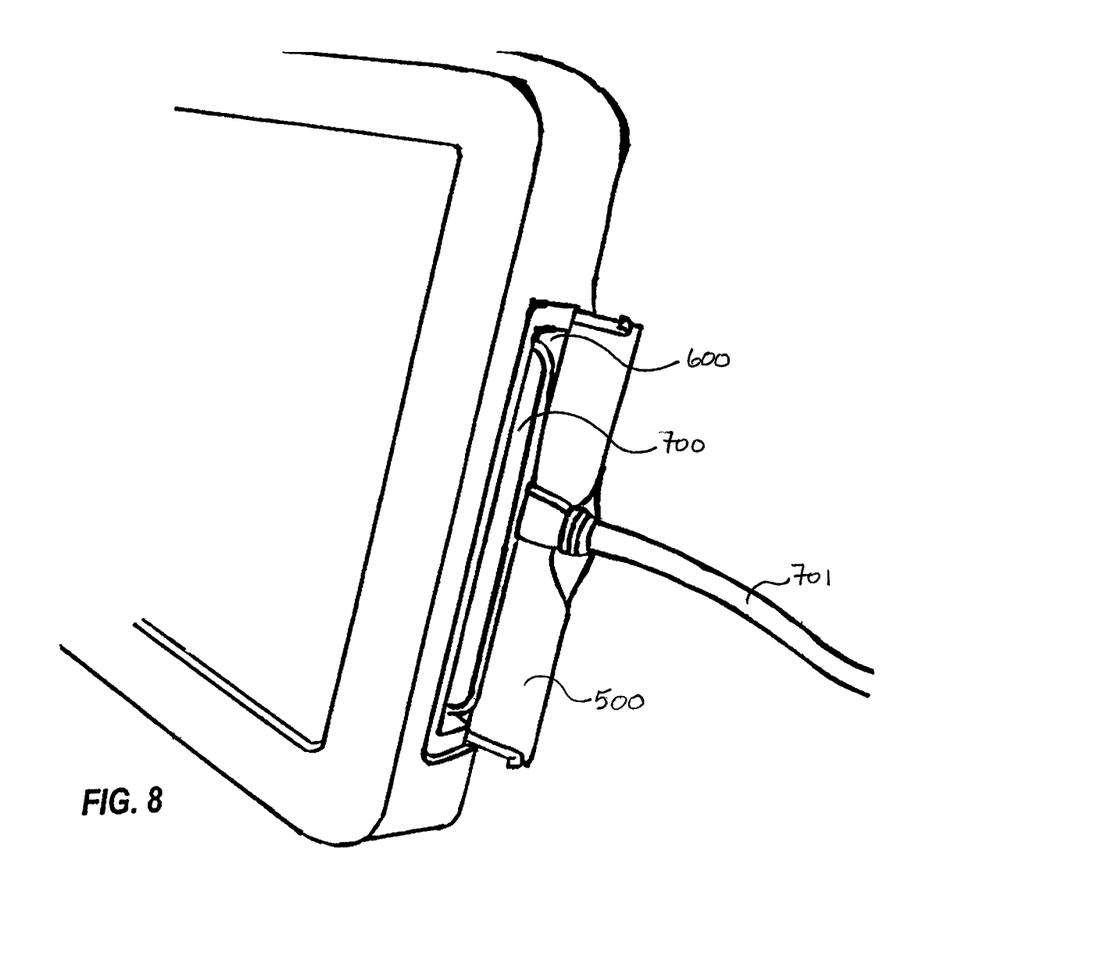
FIG. 8 illustrates how a portable electronic media source device can be inserted into the cavity, according to one embodiment of the present invention.

FIG. 8 illustrates how a portable electronic media source device can be inserted into the cavity. In this example, the media source device 700 has been fully inserted into the cavity 600. The cable 701 that electronically couples the media source device to the cavity has not yet been fully inserted, however, once the cable is inserted into the cavity (not shown), the cavity door 500 can be closed, effectively hiding the media source device from user view.

Figure 9:
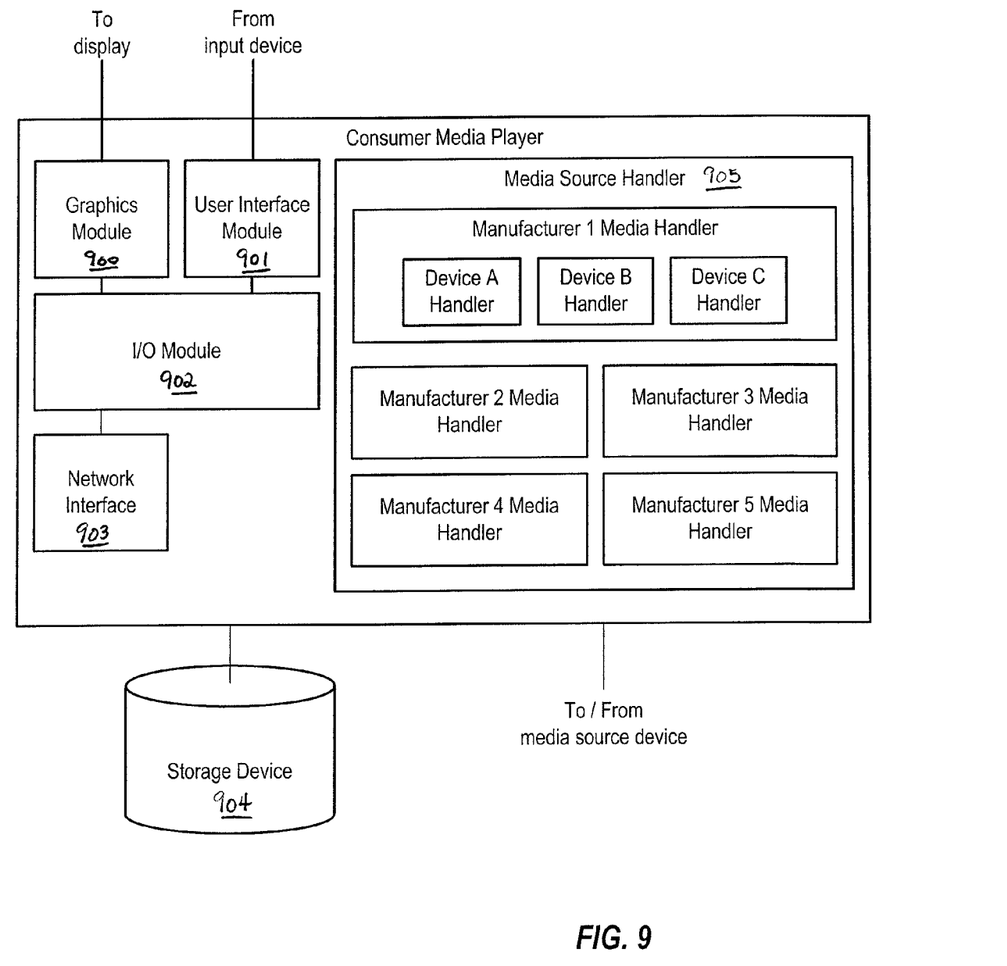
FIG. 9 is a block diagram of a consumer media player that is configured to receive a variety of portable electronic media source devices, each of which may have a different manufacturer and/or be of a different type, according to one embodiment of the present invention.

FIG. 9 is a block diagram of the logical components of a consumer media player that is configured to receive a variety of portable electronic media source devices, each of which may have a different manufacturer and/or be of a different size, shape, and/or type. The consumer media player can be configured with a cavity or other physical receptacle for holding all or part of the media source devices (e.g., as shown and described above). Some of these logical components (e.g., media source handler 905) may be implemented in software, while others may be implemented at least partially in hardware. Some, like storage device 904, include hardware components.

As shown, the consumer media player includes a graphics module 900, which is configured to render graphical content (e.g., as generated by an input and/or output (I/O) module) and encode that graphical content in a format (e.g., low voltage differential signaling (LVDS) signals) that can be provided to a display device (e.g., a liquid crystal display (LCD) device). The consumer media player also includes a user interface module 901 that is configured to detect user input provided via an input device (e.g., a touch screen, keypad, remote control, or the like) and to provide information identifying this input to the I/O module 902.

The I/O module 902 is configured to generate display screens (and/or audio options) that prompt a user for information and/or to play media in response to user requests detected by the user interface module 901. The I/O module 902 can thus generate display screens that are similar to those shown in FIGS. 1-4. Some display screens can be generated automatically (e.g., upon system start up, upon a new media source device being electronically coupled to the consumer media player, upon system shutdown, and the like), while others can be displayed in response to user input.

The I/O module 902 can be coupled to a network interface 903 that allows the consumer media player to connect to a network (e.g., such as the Internet) in order to register the consumer media player, obtain additional information (e.g., such as album art and song titles), and the like. The I/O module 902 can cause information obtained via the network interface 903 to be stored on a storage device 904, which can be included within and/or coupled to the consumer media player.

The I/O module 902 is also configured to play media stored on the storage device 904, by causing selected media file(s) be played for a user as audio and/or video content. In some embodiments, the I/O module 902 can also play media files that are stored on a media source device and that have not been stored on the local storage device 904 shown in FIG. 9.

The media source handler 905 is configured to identify media files from a variety of different media source devices and, in some situations, to store the identified media files and/or information identifying the identified media files in the local storage device 904. In order to be able to handle different types of media source devices, the media source handler 905 includes a variety of different manufacturer and/or device type specific media source handlers. The specific media source handlers included on the consumer media player can be modified (e.g., if needed to support new types of devices introduced after the sale of the consumer media player) over time (e.g., new handlers can be downloaded to the consumer media player via the network interface).

In this example, the media source handler 905 includes specific media handlers for 5 different manufacturers, Manufacturers 1-5. It is noted that some specific handlers (not shown) may be specific to a type of device (e.g., USB flash drives) and not specific to a particular manufacture. Some manufactures may supply multiple different source media devices, each of which requires a different handler. Thus, some manufacturer specific handlers can include multiple different device-specific handles. For example, Manufacturer 1 has three different device-specific handlers for devices of types Device A, Device B, and Device C. These types of devices can be defined based upon device families (e.g., MP3 players, phones, and Internet browsing devices), device releases, and the like.

When a new media source device is electronically coupled to the consumer media player, the consumer media player can use identifying information (e.g., in terms of identification numbers (e.g., serial numbers, MAC addresses, and the like) associated with the new media source device to determine the appropriate media handler to use to access that device. For example, if the new media source device provides information to the consumer media player indicating that the new media source device is a USB flash drive, the media source handler 905 will select the specific media handler configured to handle USB flash drives. If the new media source device provides information indicating that the new media source device was manufactured by Manufacturer 4, the media handler will select Manufacturer 4 Media Handler to access the new media source device.

Figure 10:
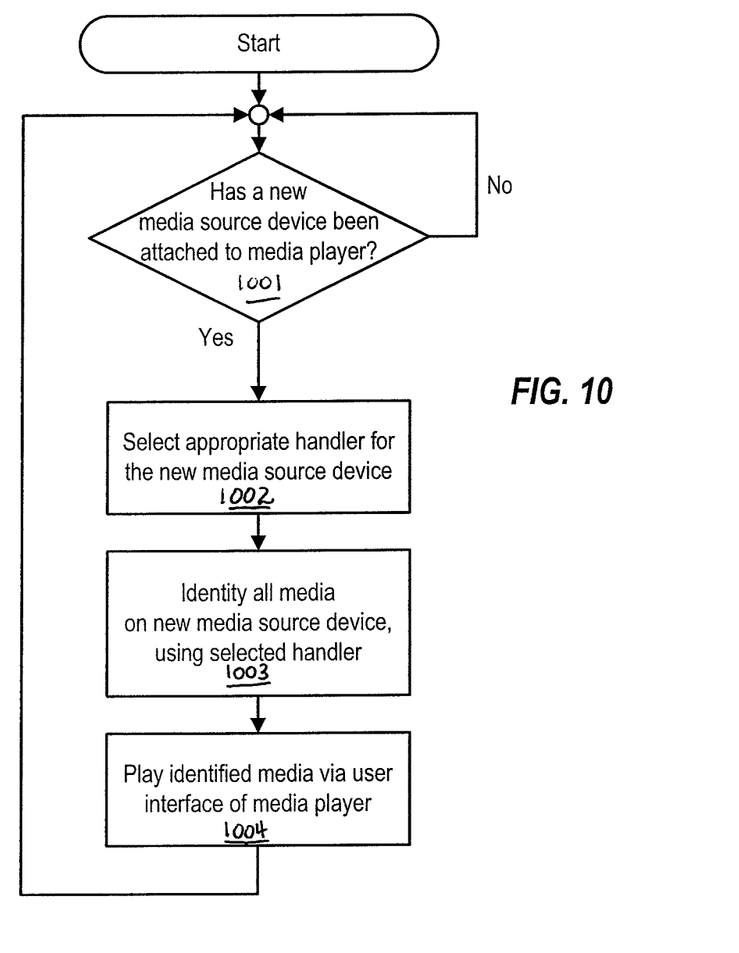
FIG. 10 is a flowchart of a method of operating a consumer media player that is configured to receive a variety of portable electronic media source devices, each of which may have a different manufacturer and/or be of a different type, according to one embodiment of the present invention.

FIG. 10 is a flowchart of a method of operating a consumer media player that is configured to receive a variety of portable electronic media source devices, each of which may have a different manufacturer and/or be of a different type. The method involves detecting, at 1001, whether a new media source device has been attached to the media player. If so, the appropriate handler for that new media source device is selected, as described above and shown at 1002. Selection of the appropriate handler can be based upon the type and/or manufacturer of the media source device. The type of device can refer to the purpose of the device as well as any particular protocols or standards supported by the device.

Once the appropriate handler has been selected, that handler is used to identify all media files on the new media source device, as shown at 1003. Identifying these media files can include identifying individual files and/or obtaining information identifying the works (e.g., songs, movies, images, and the like) include in each such file. This identifying information can be obtained from the new media source device and/or a database (e.g., accessible to the consumer media player via the Internet). Once the media has been identified, the identified media can be played for a user via the consumer media player, as shown at 1004. Prior to playing the media, the consumer media player may provide the user with a list of all of the identified media, allowing the user to select all or some of the identified media for play. The identified media is played via a generic user interface, without the user needing to physically interact with the new media source device.

Although the present invention has been described in connection with several embodiments, the invention is not intended to be limited to the specific forms set forth herein. On the contrary, the present invention is intended to cover such alternatives, modifications, and equivalents as can be reasonably included within the scope of the invention as defined by the appended claims.

What is claimed is:

1. A consumer media player comprising: a plurality of interfaces, wherein each of the interfaces is a different type of interface, and wherein each of the interfaces is configured to be coupled to a respective type of media source device;
   a chassis, wherein the chassis forms a cavity for storing one or more media source devices while the one or more media source devices are coupled to one or more of the interfaces, wherein the cavity is configured to store a first type of media source device configured to be coupled to a first type of interface, wherein the cavity is configured to store a second type of media source device configured to be coupled to a second type of interface, and wherein both the first type of media source device and the second type of media source device comprise a respective interface to allow a respective user to play a respective media file on the respective type of media source device;
   a media source handler configured to identify one or more media files stored on a first one of the one or more media source devices, in response to the first one of the one or more media source devices being coupled to a first one of the interfaces, wherein the media source handler comprises a plurality of device-specific media handlers, wherein in response to the first one of the media source devices being electronically coupled to the consumer media player by the first one of the interfaces, the media source handler is configured to use information associated with the first one of the one or more media source devices to identify which one of a plurality of types of media source devices comprises the first one of the one or more media source devices and select a corresponding one of the plurality of device-specific media handlers to identify the one or more media files stored on the first one of the one or more media source devices; and
   an Input/Output (I/O) module configured to play the one or more media files identified by the media source handler, wherein the I/O module is configured to generate a user interface, wherein the user interface is configured to display information identifying the one or more media files identified by the media source handler on the first one of the one or more media source devices and to display information identifying one or more media files identified by the media source handler on a second one of the one or more media source devices.

2. The consumer media player of claim 1, wherein the consumer media player comprises a liquid crystal display (LCD) screen and is configured to be mounted on a wall.

3. The consumer media player of claim 1, wherein the consumer media player is configured to receive user input via a remote control.

4. The consumer media player of claim 1, further comprising a touch screen.

5. The consumer media player of claim 1, further comprising a storage device, wherein the media source handler is configured to copy the one or more media files identified on the first one of the one or more media source devices to the storage device.

6. The consumer media player of claim 1, further comprising a hinged door configured to enclose the one or more media source devices within the cavity.

7. The consumer media player of claim 1, wherein the cavity comprises the plurality of interfaces, wherein the plurality of interfaces comprises a plurality of connectors, and wherein the plurality of connectors comprises a universal serial bus (USB) connector and a manufacturer-specific connector.

8. A method comprising:
- detecting that a media source device has been electronically coupled to a consumer media player by one of a plurality of interfaces of the consumer media player, wherein each of the interfaces is a different type of interface, wherein each of the interfaces is configured to be coupled to a respective type of a plurality of types of media source devices, wherein the consumer media player comprises a chassis that forms a cavity for storing the media source device while the media source device is electronically coupled to the consumer media player, wherein the cavity is configured to store a first type of media source device configured to be coupled to a first type of interface, wherein the cavity is configured to store a second type of media source device configured to be coupled to a second type of interface, and wherein both the first type of media source device and the second type of media source device comprise a respective interface to allow a respective user to play a respective media file on the respective type of media source device;
- in response to the media source device being electronically coupled to the consumer media player by the one of the interfaces, accessing information associated with the media source device;
- identifying, based upon the information, a type of media source device that comprises the media source device; and
- selecting a corresponding one of a plurality of device-specific media handlers to identify the one or more media files stored on the media source device, wherein the consumer media player comprises the plurality of device-specific media handlers;
- identifying one or more media files stored on the media source device, in response to the media source device being coupled to the one of the plurality of interfaces, wherein the identifying the one or more media files is performed by the selected one of the plurality of device-specific media handlers;
- playing the one or more identified media files on the consumer media player; and
- generating a user interface, wherein the user interface is configured to display information identifying the one or more media files stored on the media source device, in response to the media source device being electronically coupled to the consumer media player, and to display information identifying one or more additional media files on an additional media source device, in response to the additional media source device being electronically coupled the consumer media player by one of the plurality of interfaces.

9. The method of claim 8, wherein the consumer media player comprises a liquid crystal display (LCD) screen and is configured to be mounted on a wall.

10. The method of claim 8, further comprising the consumer media player receiving user input via a remote control.

11. The method of claim 8, wherein the consumer media player comprises a touch screen.

12. The method of claim 8, further comprising copying the one or more media files identified on the media source device to a storage device, wherein the consumer media player comprises the storage device.

13. The method of claim 8, further comprising enclosing the media source device within the cavity, wherein the enclosing is performed by a hinged door, and wherein a chassis of the consumer media player comprises the hinged door.

14. The method of claim 8, wherein the cavity comprises the plurality of interfaces, wherein the plurality of interfaces comprises a plurality of connectors, and wherein the plurality of connectors comprises a universal serial bus (USB) connector and a manufacturer-specific connector.

\* \* \* \* \*